United States Patent
Foureys

(10) Patent No.: US 6,633,149 B1
(45) Date of Patent: Oct. 14, 2003

(54) METHOD FOR DIGITAL CONTROL OF A UNIVERSAL MOTOR, IN PARTICULAR FOR ELECTRICAL HOUSEHOLD APPLIANCES

(75) Inventor: Phillippe Foureys, Bourg les Valence (FR)

(73) Assignee: Crouzet Appliance Controls, Montelier Chabeuil (FR)

(*) Notice: Subject to any disclaimer, the term of this patent is extended or adjusted under 35 U.S.C. 154(b) by 0 days.

(21) Appl. No.: 09/868,365

(22) PCT Filed: Dec. 15, 1999

(86) PCT No.: PCT/FR99/03145

§ 371 (c)(1),
(2), (4) Date: Aug. 9, 2001

(87) PCT Pub. No.: WO00/38310

PCT Pub. Date: Jun. 29, 2000

(30) Foreign Application Priority Data

Dec. 18, 1998 (FR) .......................................... 98 16001
Jun. 30, 1999 (FR) .......................................... 99 08366

(51) Int. Cl.⁷ ............................................... G05B 19/10
(52) U.S. Cl. .................... 318/567; 318/632; 318/801; 318/800; 318/803; 318/807; 318/799; 388/809; 388/937

(58) Field of Search ................................. 318/632, 801, 318/567, 802, 803, 807, 799, 603, 254, 138, 439; 388/809, 937

(56) References Cited

U.S. PATENT DOCUMENTS

5,969,499 A * 10/1999 Shaffer ........................ 318/801
6,043,623 A * 3/2000 McCary ...................... 318/632
6,313,601 B1 * 11/2001 Kubo et al. .................. 318/799

* cited by examiner

*Primary Examiner*—Karen Masih
(74) *Attorney, Agent, or Firm*—Lackenbach Siegel LLP

(57) ABSTRACT

The invention concerns a method for digital control of a universal motor, in particular for electrical household appliance, comprising steps which consist on: measuring said engine (21) rotation speed; determining the difference between the measured speed and a set speed; and controlling the motor on the basis of said difference. Said method further comprises a step (24, 25) which consists in estimating at least one of the values of the resisting torque (C) and the current (i) in the motor windings. The invention is useful for controlling washing machines.

22 Claims, 3 Drawing Sheets

METHOD FOR DIGITAL CONTROL OF A UNIVERSAL MOTOR, IN PARTICULAR FOR ELECTRICAL HOUSEHOLD APPLIANCES

The present invention relates to a method for the digital control of a universal motor, notably for domestic use, and more particularly such a method comprising the steps consisting in measuring the speed of rotation of the said motor, determining the difference between the measured speed and a reference speed, and controlling the said motor according to the said difference.

Universal motors are single-phase motors with a series excitation commutator, and are frequently used in the field of domestic electrical equipment, notably for driving the drums of washing or drying machines.

The regulation of the speed of rotation of a universal motor involves a tachometric generator coupled to this motor in order to supply as an output an electrical signal whose frequency is proportional to the speed, and a supply triac whose triggering angle determines the mean voltage applied to the motor windings. A control law makes it possible to adapt the triggering angle according to the speed.

Digital control methods have already been proposed. Currently, the law used is very simple since a triggering angle difference proportional to the speed difference is adopted:

$$\alpha_{n+1} = \alpha_n + A \cdot \Delta\omega \quad (1)$$

where $\alpha_i$ is the triggering angle of the triac at time $t_i$ $\Delta\omega$ is the difference between the speed measured by the tachometric generator and the reference speed, and A is a proportionality coefficient.

In addition, provision is generally made for limiting the current in the motor. To this end, a shunt makes it possible to measure this current.

Although generally giving satisfaction, this method has a certain number of drawbacks.

Firstly, it provides no access to the physical quantities other than those which are directly measured, namely essentially the speed of rotation and possibly the current in the motor. The known method is therefore relatively incomplete.

In addition, knowledge of the current requires, in addition to the presence of the shunt, knowledge of an amplifier and current to voltage converter. The result is a complication of the circuit and consequently an increase in costs. In particular, it cannot supply the true effective current without fairly powerful calculation means.

However, this knowledge of the current is particularly useful in certain applications, independently of the need to limit it, and notably in the case of the driving of the drum of a washing machine. This is because, in the case of a universal motor, the torque is directly a function of this current. And knowing the torque gives access to the load, on the assumption that the motor follows the acceleration inputs.

The load is a quantity, knowledge of which makes it possible to regulate the speed in an optimum fashion in the aforementioned case of the driving of the drum of a washing machine. This is because the effectiveness of the washing is to a major extent a function of the relative speeds of the washing and the water contained in the drum. However, when the load is low, the washing falls by itself in the washing water during its rotation. The control law can therefore advantageously be adapted to the machine load.

The present invention aims to mitigate the drawbacks set out above.

More particularly, the invention aims to provide a digital control method for a universal motor, notably for domestic use, which dispenses with the use of the shunt of the prior art.

The invention also aims to provide such a control method which makes it possible to take account of the motor load without requiring any current measurement.

In addition, the invention aims to provide such a control method which makes it possible, in the case of a washing or drying machine, to take account of the imbalance created by an irregular arrangement of the washing.

To this end, the object of the invention is a method for the digital control of a universal motor, notably for domestic use, comprising the steps consisting in measuring the speed of rotation of the said motor, determining the difference between the measured speed and a reference speed, and controlling the said motor according to the said difference, characterised by the fact that it also comprises a step of estimating at least one of the quantities including the resistive torque (C) and the current (i) in the motor windings.

It will be seen that it is possible to deduce the motor load from the resistive torque (C), which is particularly advantageous in the case of a domestic electrical appliance in which this parameter is generally unknown to the user.

The method according to the invention can also comprise the estimation of at least the moment of inertia or the coefficient of viscous friction.

It is also possible to make provision for the estimation of the resistive torque to comprise the estimation of the sum of a substantially constant mean torque and a sinusoidal imbalance component.

It is then possible, in the case of a washer, to take account of an irregular arrangement of the washing in the drum in order to obtain a more even speed of rotation of the latter.

Also in a particular embodiment, the method of the invention can comprise the step consisting in determining an estimation, possibly optimum, of the speed of rotation of the motor.

Also in a particular embodiment, it may comprise the step consisting in determining an estimation of the motor load.

Such estimations make it possible in particular to provide an optimum control taking account also of the load and operating temperature of the motor.

In particular, the method according to the invention can comprise the step consisting in determining the cycle ratio of the motor operating cycle. Cycle ratio of the motor operating cycle means here the ratio between the actual operating time and the total time of the cycle, including the time during which the motor is stopped.

In a first embodiment of the invention, the motor speed regulation is effected by any known means. It is possible in particular to determine the triggering angle of the triac by a formula such as formula (1).

It is possible on the other hand, in another embodiment of the invention, to include the aforementioned estimations in the regulation loop. The control voltage to be applied to the motor is then calculated according to these estimations, and the triggering angle of the triac is derived from this calculated voltage.

Consequently, in the method according to this embodiment of the invention, there is determined, not directly and empirically the triggering angle of the triac, but the voltage to be applied to the motor input. Being in possession of this voltage, it is possible to derive therefrom, in addition to the triggering angle, various electrical and mechanical operating parameters, and thus to optimise control.

A description will now be given, by way of non-limitative examples, of particular embodiments of the invention, with reference to the accompanying schematic drawings, in which.

The first step will be to describe the modelling of the device, and then a control law according to the invention, and finally various types of parameter estimators. Next a description will be given of the practical implementation of the invention, taking account in particular of the digital character of the control.

Modelling

Figure 1:
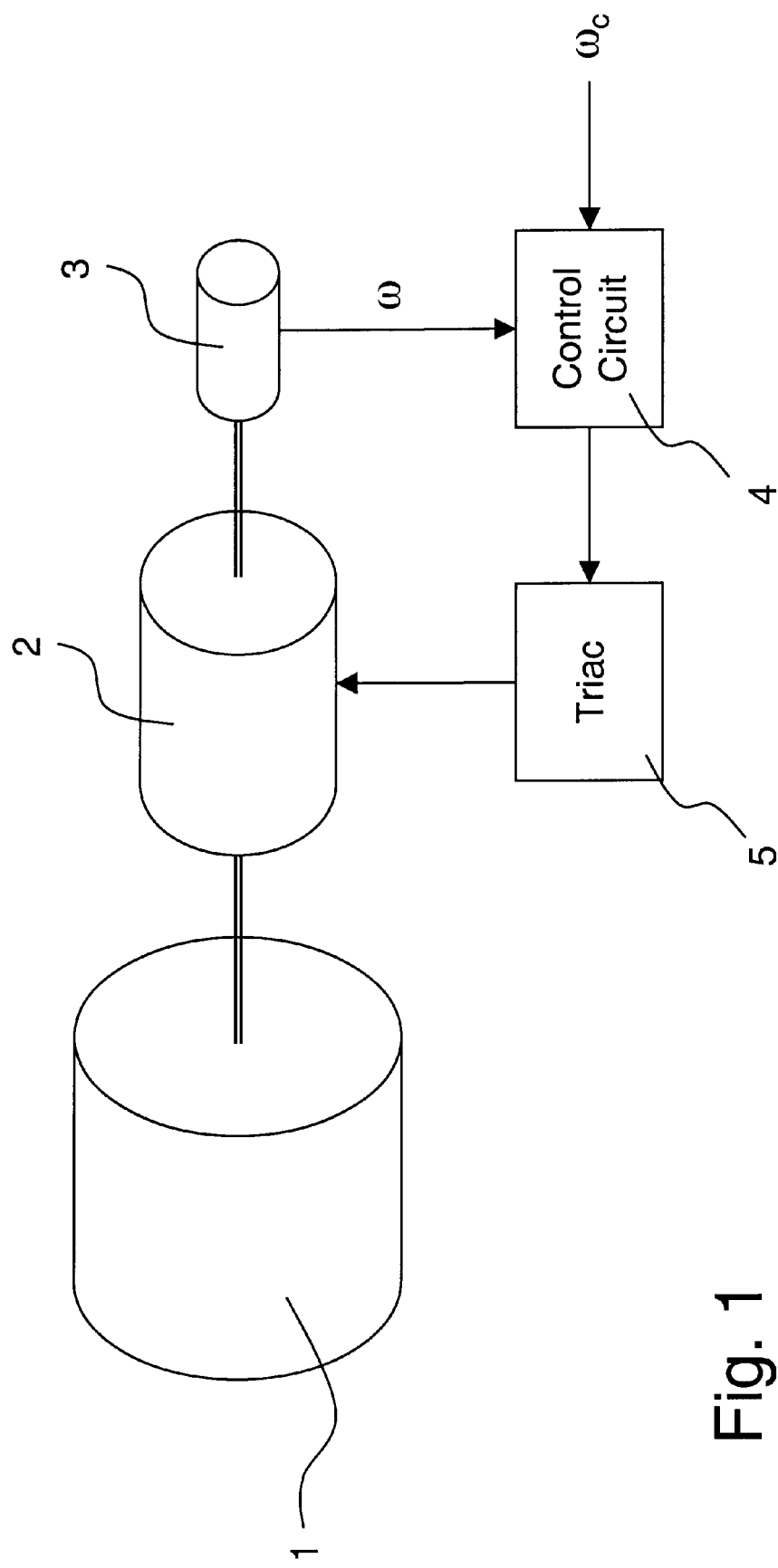
FIG. 1 is a diagram of a washing machine provided with a control device implementing the method according to the invention.

There can be seen in FIG. 1 a washing machine comprising a drum 1 disposed in a washing tank (not shown) and driven by a universal motor 2. A tachometric generator 3 is mounted on the shaft of the motor 2 in order to supply, to a control circuit 4, an electrical signal with a frequency proportional to the speed of rotation ω of the motor.

The motor 2 is supplied from the mains by means of a triac 5. The circuit 4 controls the triac 5 after having determined the required triggering angle α as a function of the speed ω and a reference speed $\omega_c$. To this end, the circuit 4 includes the necessary circuits and notably a microcontroller.

The universal motor 2 can be modelled by the system of the following two differential equations, translating respectively the mechanical and electrical functioning of the motor $$\begin{cases} J \cdot \dot{\omega} + F \cdot \omega = k_1 \cdot i^2 - C & (2) \\ L \frac{di}{dt} + Ri + k_2 i \cdot \omega = v & (3) \end{cases}$$

where $\dot{\omega}$ represents the derivative of ω with respect to the time $$\frac{d\omega}{dt},$$

J represents all the inertias related to the motor,
F is the coefficient of viscous friction,
C is the resistive torque comprising all the torques not otherwise modelled, notably the solid frictions and the fluctuations in torque due to the movement of the washing in the drum and any imbalance caused by an irregular arrangement of the washing,
L and R are respectively the inductance and resistance of the motor
i and J are respectively the current passing through the motor and the voltage at its terminals, and
$k_1$ and $k_2$ are constant coefficients.

If simplifying assumptions are made according to which the moment of inertia J is constant and therefore does not depend on the weight of washing present in the drum,
the frictions are purely viscous frictions proportional to the speed,
the term relating to the inductance is negligible compared with the other terms of the second equation, and
the coefficients $k_1$ and $k_2$ are substantially equal within the limits of use of the motor, which is proved by the fact that they are related to the geometry of the motor,
the following simplified equations are obtained $$\begin{cases} J \cdot \dot{\omega} + F \cdot \omega = k \cdot i^2 - C & (4) \\ Ri + k \cdot \omega \cdot i = v & (5) \end{cases}$$

where F is a constant.

Control Law

From the above two equations (4) and (5), it is deduced that $$\dot{\omega} = -\frac{F}{J}\omega + \frac{k}{J}\frac{v^2}{(R+k\cdot\omega)^2} - \frac{1}{J}C \qquad (6)$$

In addition, it is wished for the control law to make the behaviour of the system linear, that is to say that it is such that $$\dot{\omega} = -k.(\omega - \omega_c) \qquad (7)$$

where K is a coefficient to be chosen by experimentation. In other words, K is the inverse of the time constant for the reduction in the difference between the measured speed and the reference speed $\omega_c$, The value of K is chosen so as to obtain from the system the required behaviour in response to the given command. The coefficient K can also vary as a function of $\omega_c$.

Thus there is obtained $$v = \sqrt{\frac{1}{k}[-K \cdot J \cdot (\omega - \omega_c) + C + F \cdot \omega]} * (R + k \cdot \omega) \qquad (8)$$

which is the control law giving the voltage J to be applied to the motor as a function of the measured speed of rotation ω, the reference speed $\omega_c$ and the resistive torque C.

It is possible to introduce in addition an integral effect by adding the state y such that $$\dot{y} = \omega - \omega_c \qquad (9)$$

which leads to the control law $$v = \sqrt{\frac{1}{k}[-K \cdot J \cdot (\omega - \omega_c) + C + F \cdot \omega - K_1 \cdot y]} * (R + k \cdot \omega) \qquad (10)$$

Naturally, this equation can be used only if $$-KJ.(\omega - \omega_c) + C + F.\omega - K_1.y \geq 0 \qquad (11)$$

which occurs only for values of the speed of rotation greater than a certain limit, a function itself, moreover, of the speed difference and its derivative.

In the contrary case, $$v = \sqrt{\frac{1}{k}[C + F \cdot \omega - K_1 \cdot y]} * (R + k \cdot \omega) \qquad (12)$$

will be adopted for the control law.

The latter is itself valid only if $$C + F\cdot\omega - K_1\cdot y \geq 0 \tag{13}$$

Finally, if the last equality is not satisfied, will be taken:

$$v = \sqrt{\frac{1}{k}[F\cdot\omega - K_1\cdot y]} * (R + k\cdot\omega) \tag{14}$$

It will be seen below that it is not essential to assume that J and F are constants, subject to the introduction into the description of the system of the corresponding supplementary states.

Parameter Estimators

Whatever the control law adopted, it is necessary to obtain an estimation C of the resistive torque, that is to say to produce an estimator of the torque. More generally, it would be possible to seek to estimate the values of all the parameters not assumed to be constant.

Two approaches for obtaining such an estimator will be described. The first approach consists in minimising an energy related to the difference between the real values of the parameters and their estimated value. The other approach amounts to applying the state equations to the estimated values of the parameters.

First Approximation

First of all take the context of the above assumption, where the moment of inertia J and the coefficient of friction F are assumed to be constant and known. An integral estimator is produced, in the form $$\dot{\hat{C}}_0 = -K'\cdot J\cdot(\omega - \omega_c) \tag{15}$$

In other words, the estimation is readjusted as a function of the observed difference between the measured speed and the reference speed.

The value of K' is chosen so that the estimator behaves in the required manner.

If on the other hand it is now assumed that the moment of inertia J and the coefficient of viscous friction F are no longer constants, they are replaced by their estimations, respectively $\hat{J}$ and $\hat{F}$.

We then put $$\hat{J}\cdot\dot{\omega} + \hat{F}\cdot\omega = \frac{k\cdot v^2}{(R + k\cdot\omega)^2} - \hat{C} \tag{16}$$

which gives $$\hat{J}\cdot\dot{\omega}_c + \hat{F}\cdot\omega_c = \frac{k\cdot v^2}{(R + k\cdot\omega)^2} - \hat{C} + K\cdot\tilde{\omega} \tag{17}$$

where $\tilde{\omega}$ is the error on the estimation $\hat{\omega}$:

$$\tilde{\omega} = \hat{\omega} - \omega \tag{18}$$

The general control law is thus obtained $$v = \sqrt{\frac{\hat{F}\cdot\omega_c + \hat{C} - K\cdot\tilde{\omega} + \hat{J}\cdot\dot{\omega}_c}{k}} * (R + k\cdot\omega) \tag{19}$$

As before, this control law is valid only if $$\frac{\hat{F}\cdot\omega_c + \hat{C} - K\cdot\tilde{\omega} + \hat{J}\cdot\dot{\omega}_c}{k} \geq 0 \tag{20}$$

If this test is not satisfied, then the same control laws as above are adopted.

There are then taken, in order to estimate the different terms $$\begin{cases} \dot{\hat{C}} = -\dfrac{1}{\tau_1}\tilde{\omega} & (21) \\[4pt] \dot{\hat{F}} = -\dfrac{1}{\tau_2}\omega_c\cdot\tilde{\omega} & (22) \\[4pt] \dot{\hat{J}} = -\dfrac{1}{\tau_3}(\dot{\omega})_c\cdot\tilde{\omega} & (23) \end{cases}$$

Second Approximation

It will be assumed firstly that the mean torque $C_0$ is constant in continuous running and consequently that $\dot{C}_0 = 0$. If C is considered to be a supplementary state, there is written $$\begin{cases} \dot{\omega} = -\dfrac{F}{J}\omega - \dfrac{1}{J}C + \dfrac{k}{J}\dfrac{v^2}{(R + k\cdot\omega)^2} & (24) \\[4pt] \dot{C} = 0 & (25) \end{cases}$$

The estimator of the angular speed $\hat{\omega}$ and of the resistive torque $\hat{C}$ are defined by the following equations $$\begin{cases} \dot{\hat{\omega}} = -\dfrac{F}{J}\hat{\omega} - \dfrac{1}{J}\hat{C} + \dfrac{k}{J}\dfrac{v^2}{(R + k\cdot\omega)^2} + L_1(\omega - \hat{\omega}) & (26) \\[4pt] \dot{\hat{C}} = L_2(\omega - \hat{\omega}) & (27) \end{cases}$$

which amounts to estimating both $\omega$ and C using the difference information $\omega$.

If $\tilde{\omega}$ and $\tilde{C}$ are the errors on these estimations, equations (24) to (27) are derived $$\begin{cases} \dot{\tilde{\omega}} = -\dfrac{F}{J}\tilde{\omega} - \dfrac{1}{J}\tilde{C} - L_1(\omega - \hat{\omega}) & (28) \\[4pt] \dot{\tilde{C}} = -L_2(\omega - \hat{\omega}) & (29) \end{cases}$$

where $L_1$ and $L_2$ are the gains of the estimator.

A matrix $\Lambda$ is derived from this, such that $$\begin{pmatrix} \dot{\tilde{\omega}} \\ \dot{\tilde{C}} \end{pmatrix} = \Lambda \cdot \begin{pmatrix} \tilde{\omega} \\ \tilde{C} \end{pmatrix} \tag{30}$$

where the matrix $\Lambda$ is defined by $$\Lambda = \begin{pmatrix} -\frac{F}{J} - L_1 & -\frac{1}{J} \\ -L_2 & 0 \end{pmatrix} \quad (31)$$

Let P be the polynomial characteristic of the estimator $$P = det[\lambda \cdot I - \Lambda] = \lambda^2 - \lambda \cdot \left(-\frac{F}{J} - L_1\right) - \frac{L_2}{J} = (\lambda - p_1) \cdot (\lambda - p_2) \quad (32)$$

$p_1$ and $p_2$ being the poles of the error of the estimator which must ensure the convergence towards zero of the estimation error. These poles are chosen so as to obtain the best estimation and the gains $L_1$ and $L_2$ are derived therefrom by $$\begin{cases} L_1 = -(p_1 + p_2) - \frac{F}{J} & (33) \\ L_2 = -p_1 \cdot p_2 \cdot J & (34) \end{cases}$$

It will now be considered, on the other hand, that the resistive torque is the sum of a mean torque $\overline{C}_0$ which is constant in continuous running and an oscillator $\tau$ whose amplitude and phase difference will be determined so that the command opposes the imbalance created by the mass of wet washing. It will be assumed for this purpose that the imbalance is a sinusoidal signal whose angular frequency is equal to the mean angular frequency of the drum.

We then put $$C = \overline{C}_0 + z \quad (35)$$

with $$\ddot{z} \omega^2 . z = 0 \quad (36)$$

where $$\dot{z} = z_1 \quad (37)$$

$$\dot{z}_1 = -\omega^2 . z \quad (38)$$

If the three supplementary states C, z and $z_1$ there is written $$\begin{cases} \dot{\omega} = -\frac{F}{J}\omega - \frac{1}{J}C_0 - \frac{1}{J}z + \frac{k}{J}\frac{v^2}{(R + k \cdot \omega)^2} & (39) \\ \dot{C} = 0 & (40) \\ \dot{z} = z_1 & (41) \\ \dot{z}_1 = -\omega^2 \cdot z & (42) \end{cases}$$

It is therefore possible to write the estimator $$\begin{cases} \dot{\hat{\omega}} = -\frac{F}{J}\hat{\omega} - \frac{1}{J}\hat{C}_0 - \frac{1}{J}\hat{z} + \frac{k}{J}\hat{i}^2 + L_1(\omega - \hat{\omega}) & (43) \\ \dot{\hat{C}}_0 = L_2(\omega - \hat{\omega}) & (44) \\ \dot{\hat{z}} = \hat{z}_1 + L_3(\omega - \hat{\omega}) & (45) \\ \dot{\hat{z}}_1 = -\omega^2 \cdot \hat{z} + L_4(\omega - \hat{\omega}) & (46) \end{cases}$$

As before, the errors on the estimations are written in the form $$\begin{pmatrix} \dot{\tilde{\omega}} \\ \dot{\tilde{C}} \\ \dot{\tilde{z}} \\ \dot{\tilde{z}}_1 \end{pmatrix} = \Lambda \cdot \begin{pmatrix} \tilde{\omega} \\ \tilde{C} \\ \tilde{z} \\ \tilde{z}_1 \end{pmatrix} \quad (47)$$

with $$\Lambda = \begin{pmatrix} -\frac{F}{J} - L_1 & -\frac{1}{J} & -\frac{1}{J} & 0 \\ -L_2 & 0 & 0 & 0 \\ -L_3 & 0 & 0 & 1 \\ -L_4 & 0 & -\omega^2 & 0 \end{pmatrix} \quad (48)$$

The characteristic polynomial of the matrix $\Lambda$ is $$P = det[\lambda \cdot I - \Lambda] = \lambda^4 + \frac{L_1 \cdot J + F}{J}\lambda^3 + \frac{-L_3 - L_2 + J \cdot \omega^2}{J}\lambda^2 + \frac{L_1 \cdot J \cdot \omega^2 - L_4 + F \cdot \omega^2}{J}\lambda + \frac{-L_2 \cdot \omega^2}{J} \quad (49)$$

$$= (\lambda - p_1) \cdot (\lambda - p_2) \cdot (\lambda - p_3) \cdot (\lambda - p_4)$$

As before the poles $p_1$ to $p_4$ of the error of the estimator are chosen as a function of the required response and the gains are deduced therefrom by $$\begin{cases} L_1 = p_1 - \frac{F}{J} & (50) \\ L_2 = -\frac{J}{\omega^2}p_4 & (51) \\ L_3 = -J \cdot p_2 + \frac{J}{\omega^2}p_4 + J \cdot \omega^2 & (52) \\ L_4 = J \cdot \omega^2 \cdot p_1 - J \cdot p_3 + F \cdot \omega^2 - J \cdot \omega\frac{F}{J} & (53) \end{cases}$$

Implementation

A description will now be given, with reference to the block diagram of FIG. 2 and the flow diagram in FIG. 3, of a particular implementation of the invention.

Figure 2:
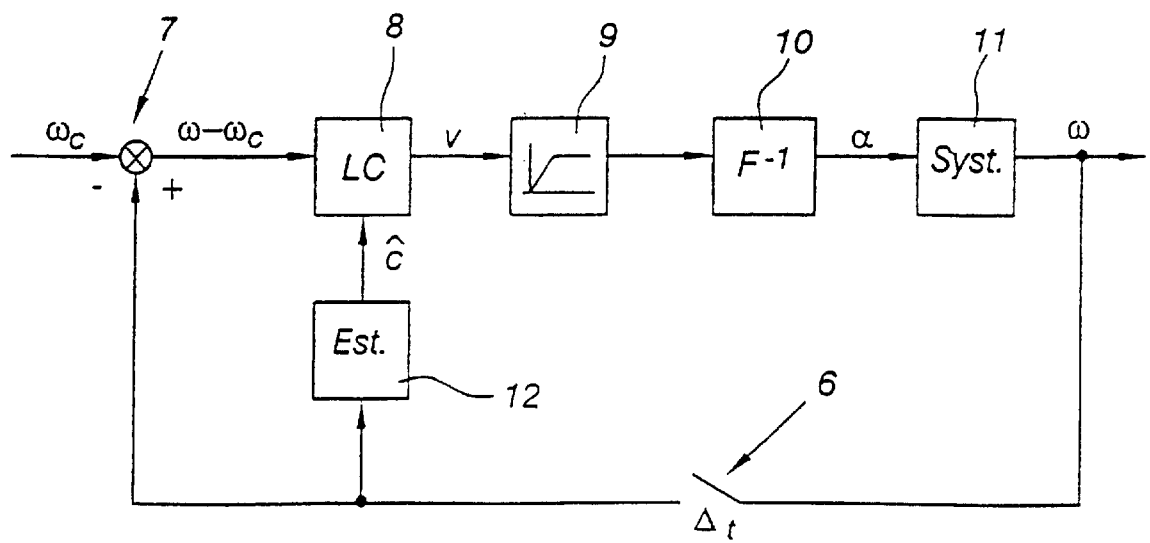
FIG. 2 is a block diagram of the control.

There can be seen in FIG. 2 a sampler 6 which samples the values of the speed $\omega$ at intervals of time $\Delta_t$. From these speed samples the successive values of the speed reference $\omega_c$ are deducted, in a subtracter 7. The speed difference $\omega - \omega_c$ is applied to the input of the unit 8 establishing the control law, which determines the voltage v to be applied to the motor 2. A voltage limiter 9 is however disposed downstream of the unit 8 in order to limit the voltage to values acceptable to the motor 2.

A block 10 determines, from the value of the voltage, possibly limited, the triggering angle $\alpha$ of the triac 5.

Taking account of its mechanical and electrical characteristics, the system 11, comprising essentially the washer and its content, adopts the speed $\omega$.

The sampled speed is also used in the estimator 12 in order to supply the estimated torque $\hat{C}$. This estimation is itself supplied to the unit 8 for calculating the voltage to be applied to the motor 2.

It will be observed that, as mentioned previously, the estimator 12 could also estimate the coefficient of friction F and the moment of inertia J if the latter were not considered to be constant. The estimated values F̂ and Ĵ would then in this case also be supplied to the calculation unit 8.

It will also be observed that the subtracter 7 receives the measured speed ω directly as an input. It would however be possible to conceive estimating this speed with an optimum estimator such as a Kalman filter.

Figure 3:
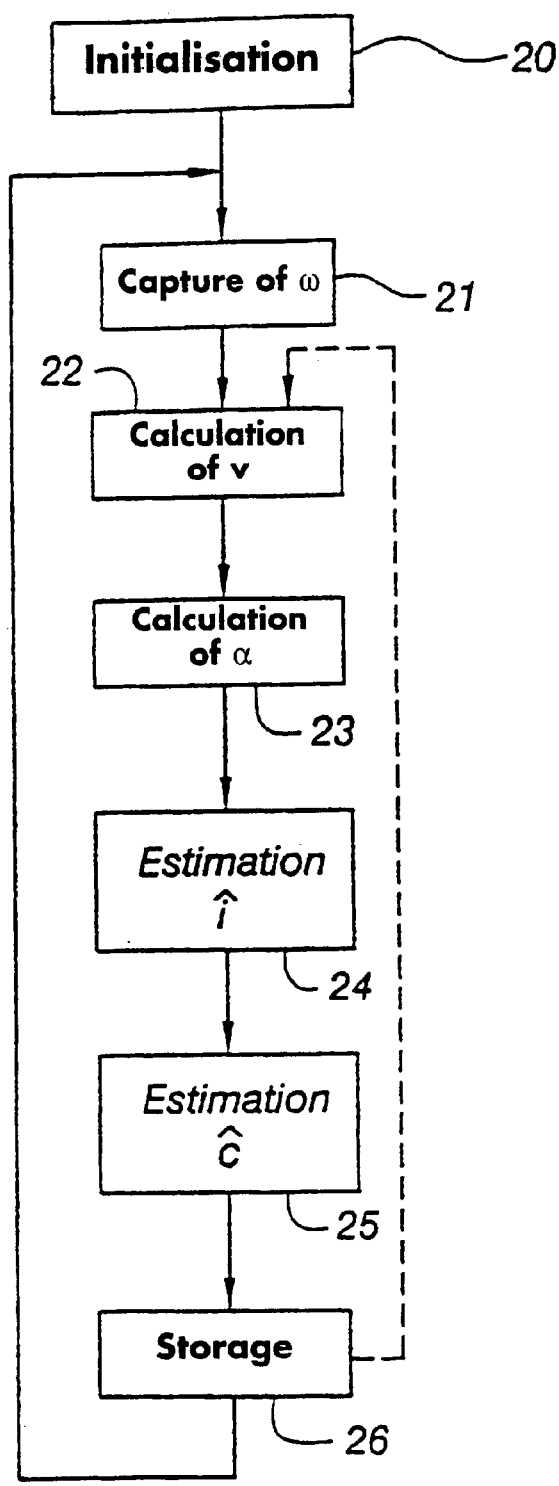
FIG. 3 is a flow diagram of the method.

Reference will now be made to FIG. 3.

Step 20 of the method consists in initialising the different values of the parameters when the device is started up. This step is obviously not reiterated at the following cycles.

Each cycle, of a duration Δt equal to the sampling period, commences with the capture of the speed of rotation ω at 21 and the calculation of the voltage $v_t$ to be applied to the motor at 22. This calculation is made for example using equations (10) to (14), replacing the speed ω in the equations with the measured speed $ω_t$ and the torque C with the torque Ĉ estimated at the previous cycle.

From $v_t$, the triggering angle $α_t$ is determined at 23, by means of a formula of the type $$α_t = F^{-1}(v_t) \quad (54)$$

which can for example define a linear equation, whose coefficients will be determined by experimentation.

Next the current is estimated at 24 by the equation $$\hat{i}_1 = \frac{v_t}{R + k \cdot ω_t} \quad (55)$$

and then at 25 the torque, by means of the following equations derived from equations (26) and (27)

$$\begin{cases} \hat{ω}_{t+1} = \left[1 - Δ_T\left(\frac{F}{J} + L_2\right)\right] \cdot \hat{ω}_t - \frac{Δ_T}{J}\hat{C}_t + \frac{k \cdot Δ_T}{J}\hat{i}^2 + Δ_T \cdot L_1 \cdot ω_t & (56) \\ \hat{C}_{t+1} = \hat{C}_t + Δ_T \cdot L_2(ω_t - \hat{ω}_t) & (57) \end{cases}$$

where $L_1$ and $L_2$ are determined by equations (33) and (34).

At 26, the newly calculated estimations $\hat{ω}_{t+1}$ and $\hat{C}_{t+1}$ are stored in place of $\hat{ω}_t$ and $\hat{C}_t$ and a new cycle can commence.

By virtue of the estimation of the intensity i, it is possible to limit the current in the windings of the motor. If in fact the estimation exceeds a critical value, the triggering angle α is modified so as to bring the current down to an acceptable value. It will be noted that it is thus possible to control the current without measuring it, which was one of the objectives of the invention. Moreover, account has not been taken here of the factor Ldi/dt. Such a taking into account would however not present any particular difficulty if the precision of the estimation so required.

Having estimated values for the current and for the torque has many advantages.

With regard to the current, it makes it possible to determine the dissipated energy $R.i^2$ and consequently also to estimate the temperature of the motor. Account can be taken of this in order to determine the cycle ratio of the operating cycle of the motor.

The estimation of the torque also supplies an estimation of the load on the machine. There too, it is possible to use this information in order to determine the aforementioned cycle ratio. An optimisation of this cyclic ratio can moreover be sought as a function of both the temperature and load estimations.

What is claimed is:

1. A method for the digital control of a universal motor, having a triac, the method comprising the steps of:

measuring the speed of rotation (ω) of the said motor,
    determining the difference between the measured speed and a reference speed ($ω_c$), and
    controlling a triggering angle of the triac as a function of said difference,
    characterized by the fact that the step of determining the difference between the measured speed and the reference speed comprises a step of estimating at least one of the quantities comprising the resistive torque (C) and the current (i) in the motor windings.

2. A method for the digital control of a universal motor according to claim 1, in which the determination (22) of a voltage to be applied to the motor also comprises the estimation of at least the moment of inertia (J) of the coefficient of viscous friction (F).

3. A method for the digital control of a universal motor according to claim 1, in which the estimation on the resistive torque (C) comprises the estimation of the sum of a substantially constant mean torque and an imbalance oscillator.

4. A method for the digital control of a universal motor according to claim 2, in which the estimation on the resistive torque (C) comprises the estimation of the sum of a substantially constant mean torque and an imbalance oscillator.

5. A method for the digital control of a universal motor according to claim 1, comprising the step consisting in determining an estimation of the speed of rotation of the motor.

6. A method for the digital control of a universal motor according to claim 2, comprising the step consisting in determining an estimation of the speed of rotation of the motor.

7. A method for the digital control of a universal motor according to claim 3, comprising the step consisting in determining an estimation of the speed of rotation of the motor.

8. A method for the digital control of a universal motor according to claim 1, comprising the step consisting in determining an estimation of the load on the motor.

9. A method for the digital control of a universal motor according to claim 2, comprising the step consisting in determining an estimation of the load on the motor.

10. A method for the digital control of a universal motor according to claim 3, comprising the step consisting in determining an estimation of the load on the motor.

11. A method for the digital control of a universal motor according to claim 5, comprising the step consisting in determining an estimation of the load on the motor.

12. A method for the digital control of a universal motor according to claim 1, comprising the step consisting in determining the cycle ratio of the motor operating cycle.

13. A method for the digital control of a universal motor according to claim 2, comprising the step consisting in determining the cycle ratio of the motor operating cycle.

14. A method for the digital control of a universal motor according to claim 3, comprising the step consisting in determining the cycle ratio of the motor operating cycle.

15. A method for the digital control of a universal motor according to claim 5, comprising the step consisting in determining the cycle ratio of the motor operating cycle.

16. A method for the digital control of a universal motor according to claim 8, comprising the step consisting in determining the cycle ratio of the motor operating cycle.

17. A method for the digital control of a universal motor according to claim 1, comprising the steps consisting in:

calculating, according to said estimations, the control voltage to be applied to the motor, and
    deriving the triggering angle of the triac from this calculated voltage.

18. A method for the digital control of a universal motor according to claim 2, comprising the steps consisting in:
- calculating, according to said estimations, the control voltage to be applied to the motor, and
- deriving the triggering angle of the triac from this calculated voltage.

19. A method for the digital control of a universal motor according to claim 3, comprising the steps consisting in:
- calculating, according to said estimations, the control voltage to be applied to the motor, and
- deriving the triggering angle of the triac from this calculated voltage.

20. A method for the digital control of a universal motor according to claim 5, comprising the steps consisting in:
- calculating, according to said estimations, the control voltage to be applied to the motor, and
- deriving the triggering angle of the triac from this calculated voltage.

21. A method for the digital control of a universal motor according to claim 8, comprising the steps consisting in:
- calculating, according to said estimations, the control voltage to be applied to the motor, and
- deriving the triggering angle of the triac from this calculated voltage.

22. A method for the digital control of a universal motor according to claim 12, comprising the steps consisting in:
- calculating, according to said estimations, the control voltage to be applied to the motor, and
- deriving the triggering angle of the triac from this calculated voltage.

* * * * *